United States Patent
Sakamoto

[11] Patent Number: 5,929,835
[45] Date of Patent: Jul. 27, 1999

[54] TONE CORRECTING SYSTEM FOR A DISPLAY

[75] Inventor: Mitsunao Sakamoto, Saitama-ken, Japan

[73] Assignee: Pioneer Electronic Corporation, Tokyo, Japan

[21] Appl. No.: 08/527,180

[22] Filed: Sep. 12, 1995

Related U.S. Application Data

[63] Continuation of application No. 08/274,706, Jul. 14, 1994, abandoned.

[30] Foreign Application Priority Data

Jul. 19, 1993 [JP] Japan ................................ 5-178323

[51] Int. Cl.$^6$ .................... G09G 5/00; H04N 1/40
[52] U.S. Cl. .................... 345/112; 358/456; 358/298; 348/674
[58] Field of Search .................... 345/112, 154; 348/674; 358/523, 525, 300, 500

[56] References Cited

U.S. PATENT DOCUMENTS

| | | | |
|---|---|---|---|
| 4,468,693 | 8/1984 | Fujita et al. | 358/525 |
| 4,716,462 | 12/1987 | Wargo et al. | 348/701 |
| 5,189,441 | 2/1993 | Fukui et al. | 358/300 |
| 5,257,108 | 10/1993 | Muraoka | 348/674 |
| 5,280,348 | 1/1994 | Honma et al. | 358/500 |
| 5,371,612 | 12/1994 | Sakamoto | 358/456 |
| 5,455,682 | 10/1995 | Ikuta | 358/298 |

*Primary Examiner*—Amare Mengistu
*Attorney, Agent, or Firm*—Nikaido, Marmelstein, Murray & Oram LLP

[57] ABSTRACT

An A/D converter is provided for converting input video signal to a tone control unit is provided to produce a control signal a value of which increases non-linearly with respect to an input value. A modulator is provided for generating a driving signal for driving a display panel. The driving signal is modulated in dependence on the tone data and the control signal.

4 Claims, 10 Drawing Sheets

| IUPUT | | | OUTPUT |
|---|---|---|---|
| SEL2 | SEL1 | SEL0 | OUT |
| L | L | L | A (1/2 CLK) |
| L | L | H | B (1/3 CLK) |
| L | H | X | C (1/5 CLK) |
| H | X | X | D (1/9 CLK) |

TONE CORRECTING SYSTEM FOR A DISPLAY

This application is a continuation of application Ser. No. 08/274,706 filed Jul. 14, 1994 now abandoned.

BACKGROUND OF THE INVENTION

The present invention relates to a system for correcting a tone of a display such as a matrix display device.

Figure 10:
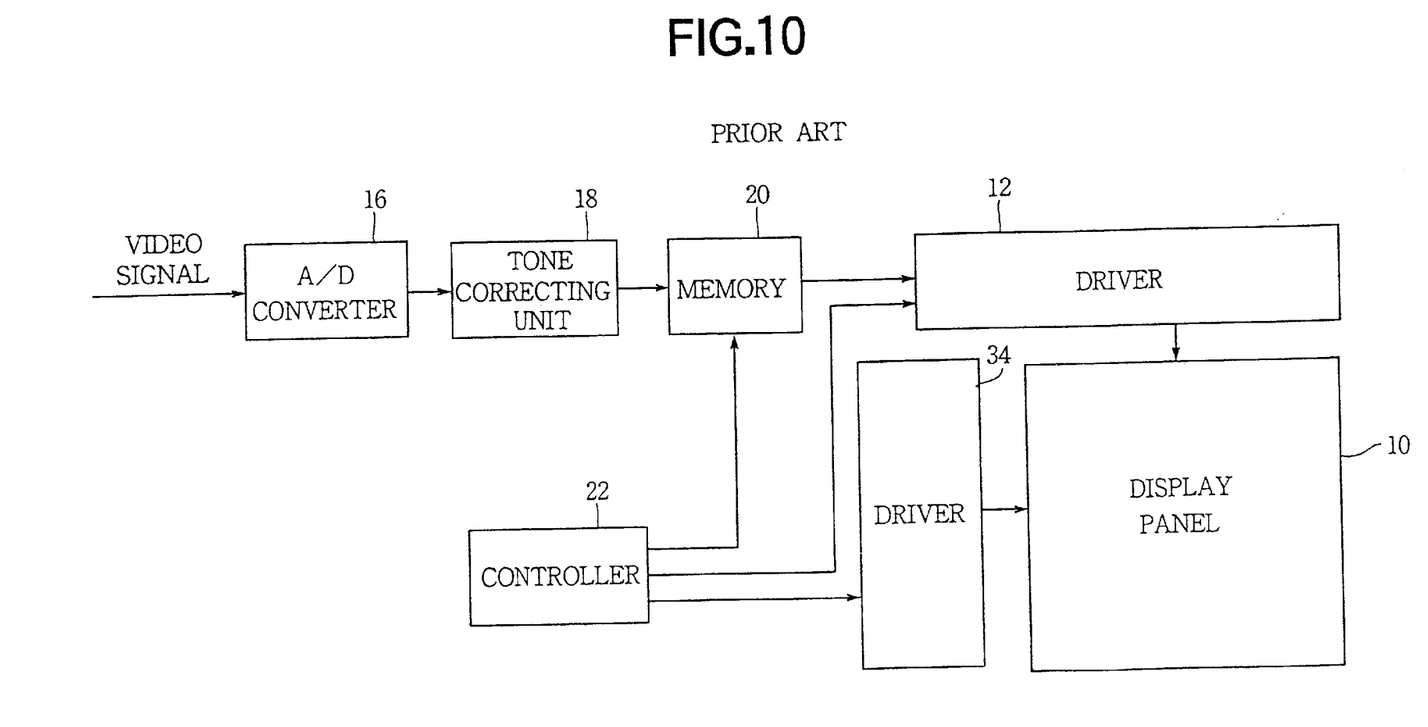
FIG. 10 is a block diagram showing a conventional display device.

FIG. 10 shows a conventional matrix display device.

The display device comprises a display panel 10 driven by a signal electrode driver 12 and a scanning electrode driver 14.

A video signal is applied to an A/D converter 16 in which the video signal is converted into a digital signal. The converted signal is applied to a memory 20 through a tone correcting unit 18 and stored therein. A controller 22 is provided for controlling the memory 20 and the drivers 12 and 14. The memory 20 applies a data signal to the signal electrode driver 12.

In the system, the tone correcting unit 18 is provided for directly applying gamma ($\tau$) correction to the converted digital video signal. Accordingly, problems rise as follows.

(1) The effective number of luminances is extremely reduced. If the number of luminances at the input is 256, the number of luminances at the output is reduced to 183.

(2) If the input signal has a linear characteristic, a black part on the panel becomes toneless by the correction.

In the case that the analog video signal is corrected at the gamma, following problems rise.

(1) It is difficult to adjust a correcting value.

(2) The signal can not be reproduced.

(3) Tone changes with time. Namely, a correction curve changes.

SUMMARY OF THE INVENTION

An object of the present invention is to provide a tone correcting system in which the $\tau$ correction is properly performed, thereby providing a proper gamma characteristic.

According to the present invention, there is provided a tone correcting system for a display having a display panel, comprising converting means for converting an input signal to a tone data, control signal generator means for generating a control signal a value of which varies non-linearly with respect to an input value, modulator means for generating a driving signal for driving the display panel, the driving signal being modulated in dependence on the tone data and the control signal.

In the present invention, data of the digital video signal is modulated by a PWM (pulse width modulation) system or PDM (pulse density modulation) system to provide a desired gamma characteristic.

The correcting system has a circuit having a non-linear characteristic. Namely, the output of the circuit does not linearly change with respect to the input. Thus, the tone of the reproduced image has a non-linear characteristic.

The other objects and features of this invention will become understood from the following description with reference to the accompanying drawings.

DETAILED DESCRIPTION OF THE PREFERRED EMBODIMENT

Figure 1:
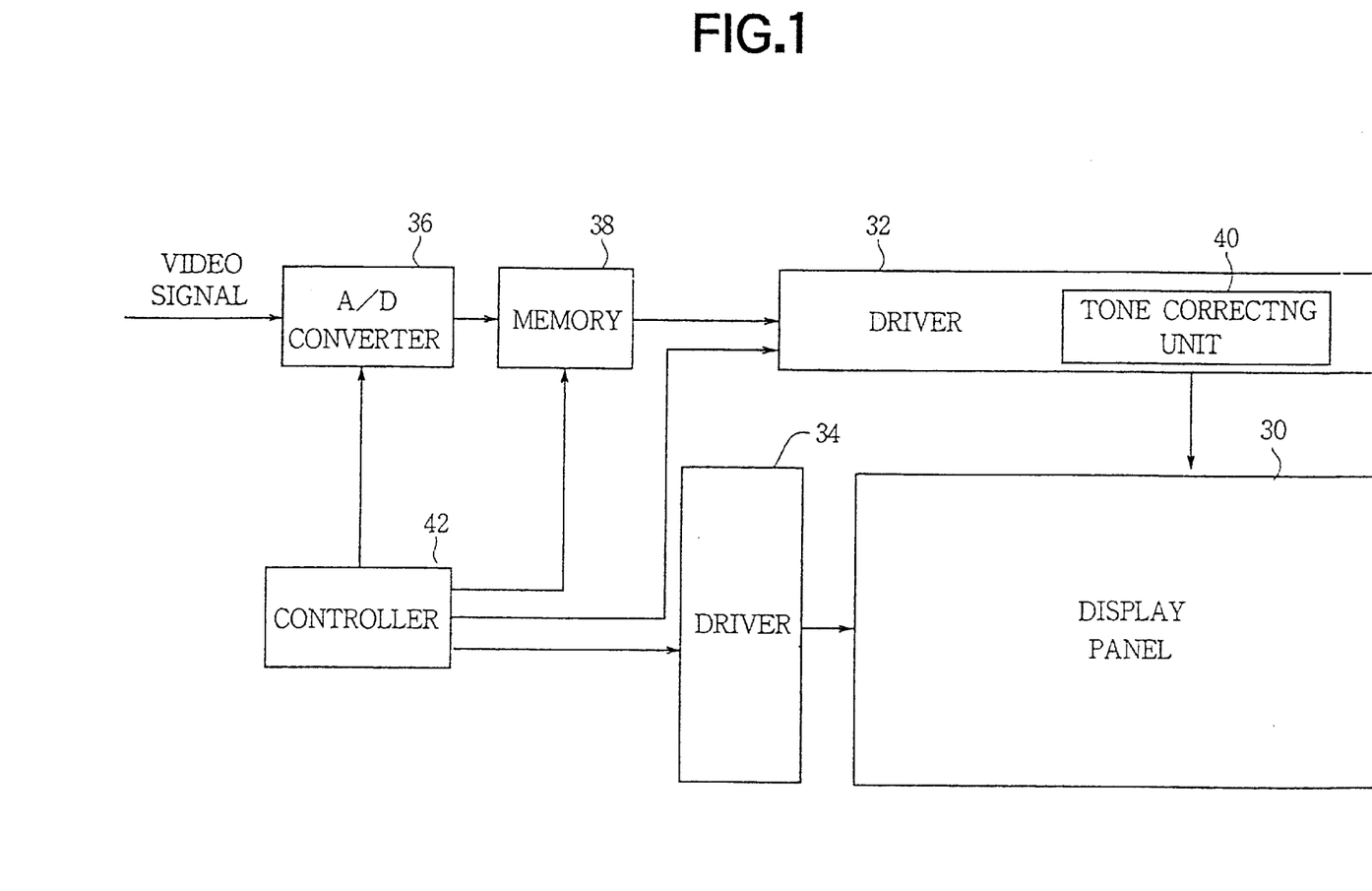
FIG. 1 is a block diagram showing a matrix display a device provided with a system of the present invention.

Referring to FIG. 1 showing a matrix display device of the present invention, the display device comprises a display panel 30 driven by a signal electrode driver 32 and a scanning electrode driver 34, an A/D converter 36 to which a video signal is applied, a memory 38 connected to the A/D converter, and a controller 42 for controlling the A/D converter 36, memory 38 and drivers 32 and 34. A tone correcting unit 40 is provided in the signal electrode driver 32 for correcting the gamma $\tau$.

Figure 2:
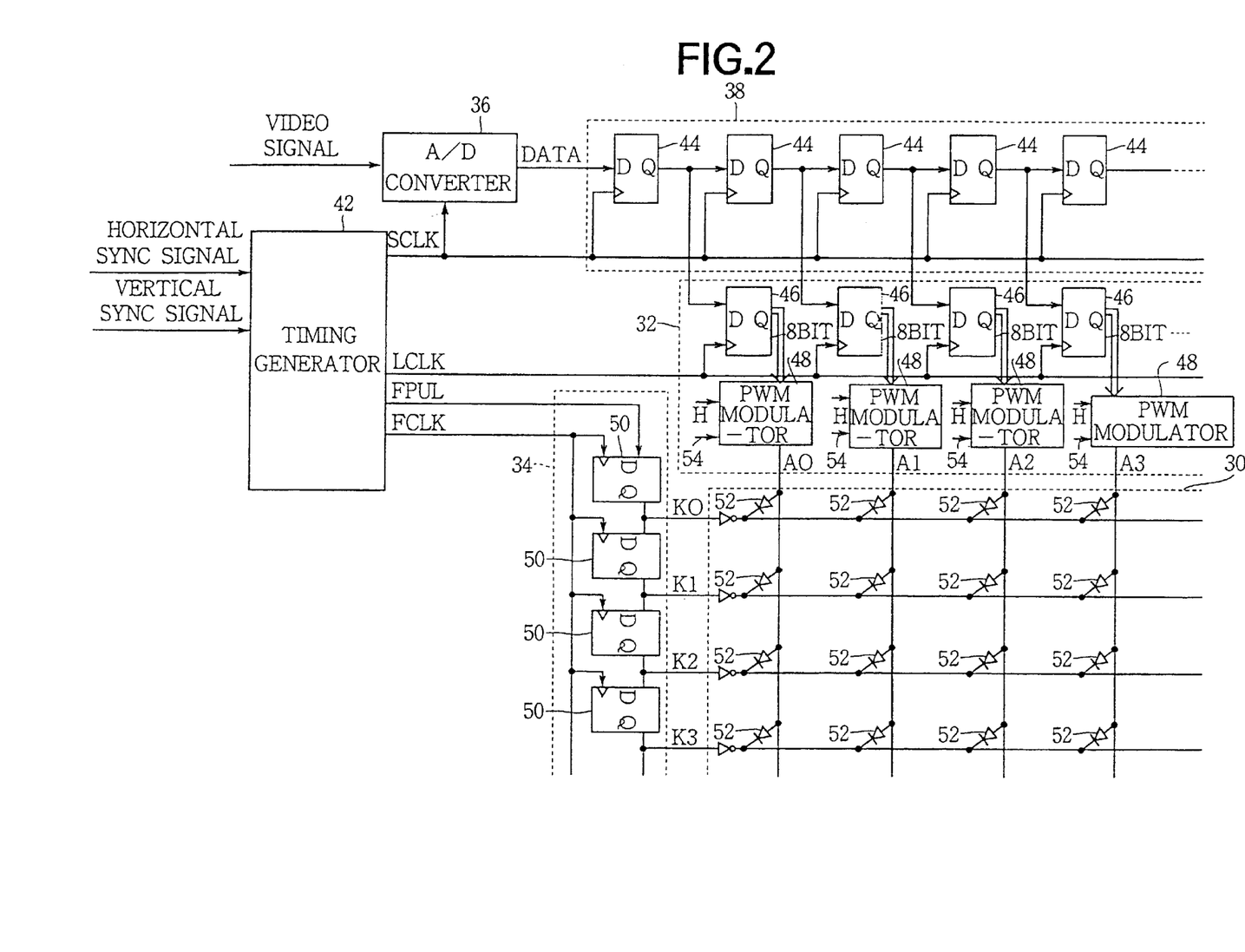
FIG. 2 is a a block diagram showing the display device.

Referring to FIG. 2, the display panel 30 has a plurality of signal electrodes A0, A1, A2, A3 . . . and a plurality of scanning electrodes K0, K1, K2, K3. . . . Each light emitting element 52 is connected to the scanning electrode and the signal electrode at every intersection, thereby forming a pixel.

The memory 38 is a shift register and comprises a plurality of flip-flops (hereinafter called FFs) 44 connected in series and applied with a tone DATA of the A/D converter 36. The signal electrode driver 32 comprises a plurality of flip-flops (FFs) 46 connected to the FFs 44 of the shift register 38 and a plurality of PWM (pulse width modulation modulators 48 connected to the FFs 46. Each modulator 48 is applied with a horizontal sync signal H and a control signal 54.

Figure 3:
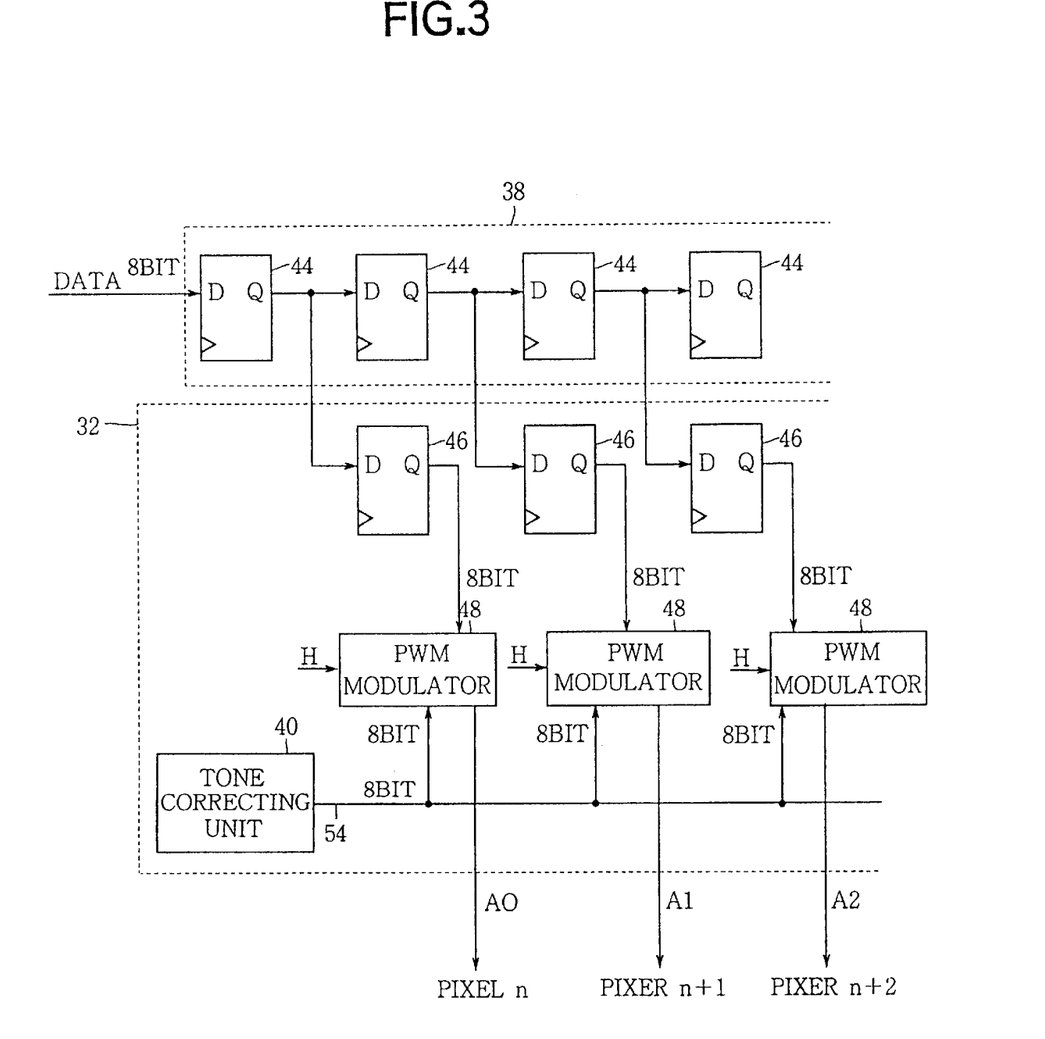
FIG. 3 is a block diagram showing a signal electrode driver in the display device.

Referring to FIG. 3, the tone correcting unit 40 provided in the signal electrode driver 32 produces the control signal 54, which will be described hereinafter in detail.

The PWM modulators 48 produce driving signal in the form of pulses which are applied to signal electrodes A0, A1, A2, A3. . . , each having a pulses width dependent on the data DATA.

Referring back to FIG. 2, the scanning electrode driver 34 comprises a plurality of flip-flops 50 connected to scanning electrodes K0, K1, K2, K3. . . The controller 42 is a timing generator applied with horizontal and vertical sync signals and produces signals SCLK, LCLK, FPUL and FCLK. The signal SCLK is applied to the A/D converter 36 and FFs 44 of the shift register 38. The signal LCLK is applied to FFs 46 of the signal electrode driver 32. The signals FPUL and FCLK are applied to FFs 50 of the scanning electrode driver 34.

Figure 4:
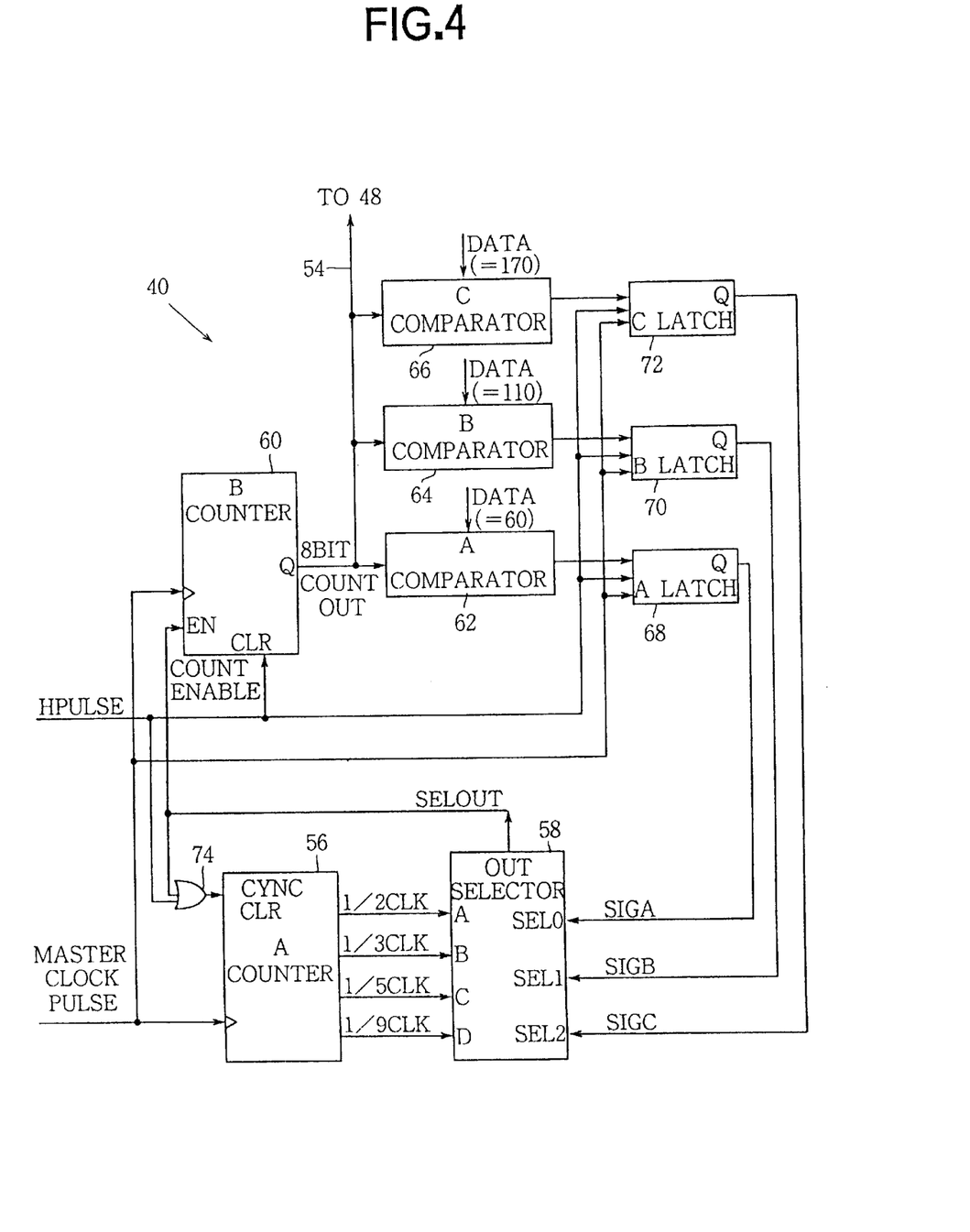
FIG. 4 is a block diagram showing a tone correcting unit.

Referring to FIG. 4 showing the tone correcting unit 40, the unit is provided for correcting a tone when the modulator 48 in the driver 32 modulates the digital video signal to a tone signal. The unit comprises an A counter 56 and a B counter 60 applied with a master clock pulse signal and a horizontal sync pulse signal HPULSE, a selector 58 having input terminals A, B, C and D, and select terminals SEL0, SEL1 and SEL2, A, B and C comparators 62, 64 and 66 connected to the B counter 60, and A, B and latches 68, 70 and 72 connected to the A, B, C comparators 62, 64, 66, respectively and applied with master clock pulse and HPULSE signals.

The A counter 56 applied with the master clock pulse signal produces clock signals 1/2 CLK, 1/3 CLK, 1/5 CLK and 1/9 CLK which are applied to input terminals A, B, C, D of the selector 58, respectively.

The signal HPULSE is applied to a sync CLR terminal of the A counter 56 through an OR gate 74.

The selector 58 selects one of the clock signals in dependency on input signals at the select terminals SEL0, SEL1, SEL2 and produces a selected signal SELOUT through an output terminal OUT. The signal SELOUT is applied to the OR gate 74 and an EN terminal of the B counter 60. The signal HPULSE is applied to a sync CLR terminal of the B counter 60. The B counter 60 produces a count signal COUNTOUT of 8-bit which is applied to PWM modulators 48 as the control signal 54 and to A, B and C comparators 62, 64 and 66. The comparators 62, 64 and 66 are applied with data A, B and C as reference signals for comparison, respectively. The A comparator 62 is supplied with the data A of 60 pulses, the B comparator 64 is supplied with the data B of 110 pulses, and the C comparator 66 is supplied with the data C of 170 pulses. Each comparator compares the input count signal COUNTOUT with the data and produces a compared signal which is applied to the corresponding latch.

The A, B and C latches 68, 70 and 72 produce signals SIGA, SIGB and SIGC respectively which are applied to select terminals SEL0, SEL1 and SEL2 of the selector 58.

The operation of the system will be described with reference to FIGS. 5a, 5b and 6.

Figure 5:
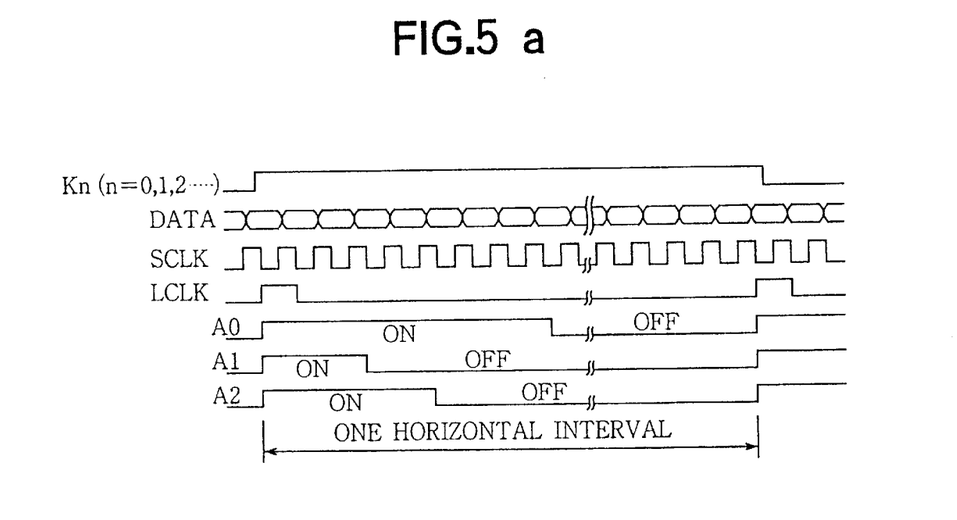
FIGS. 5a and 5b are waveforms showing signals of signal electrode driver and scanning electrode driver.

Referring to FIGS. 5a and 5b showing timing charts of signals of drivers 32 and 34, the video signal is converted at the A/D converter 36. The signal DATA is fed to the FFs 44 of the memory 38 in order at every sampling in accordance with the signal SCLK. When all of the signals DATA in one horizontal interval are applied to the FFs 44, the signals are applied to FFs 46 of the driver 32 in accordance with the signal LCLK. The signals in the FFs 46 are further applied to the PWM modulators 48 in accordance with the signal LCLK.

The signal FPUL applied to the scanning electrode driver 34 produces one pulse at one vertical interval. The signal FCLK produces one pulse at every one horizontal interval.

Figure 6:
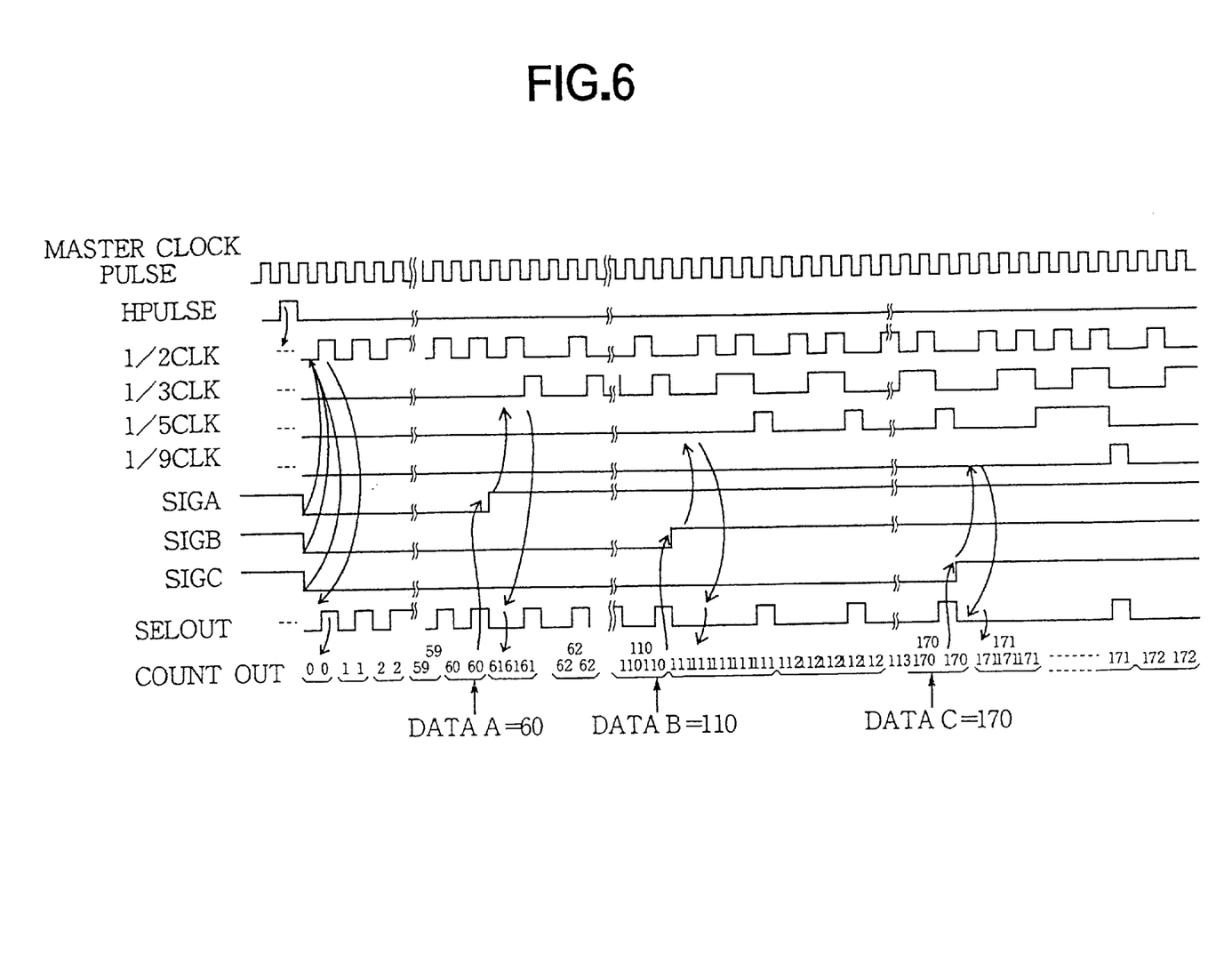
FIG. 6 is waveforms showing signals of the tone correcting unit.

Referring to FIG. 6 showing timing charts of signals of the tone correcting unit 40, the unit is operated corresponding to an interval of the horizontal sync signal HPULSE. The number of luminances is 8-bit (256 luminances) and the master clock pulse signal produces pulses 5 times as many as 256. If the clock pulse signal is produced at a high speed, it is possible to correct the tone at a large number of steps.

At the beginning, the signal HPULSE is at an "H" level to reset the counters 56, 60 and latches 68, 70, 72. Accordingly, each of the output signals SIGA, SIGB, SIGC of the respective latches 68, 70, 72 become "L" level.

Figure 7:
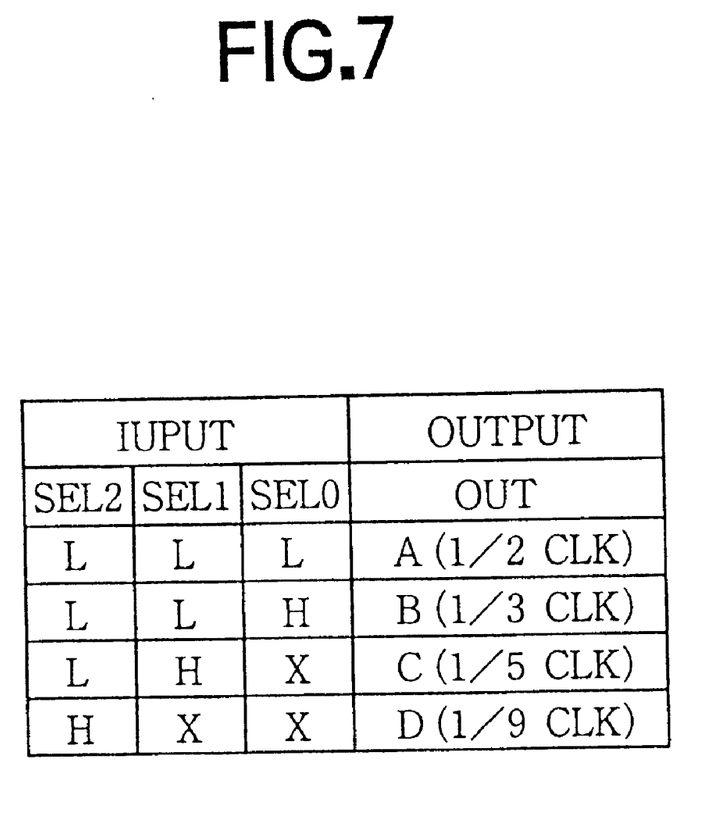
FIG. 7 is a table showing relationship between inputs and outputs of a selector in the correcting unit.

FIG. 7 is a table showing relationships between signals at the select terminals SEL0, SEL1, SEL2 and signals at the output terminal OUT of the selector 58. When the signals at the select terminals SEL0, SEL1, SEL2 are at all "L" level, the signal 1/2 CLK of the terminal A is selected and produced through the OUT.

The 1/2 CLK signal becomes "H" level at every 2 pulses of the master clock pulse signal. The B counter 60 applied with the 1/2 CLK signal is operated to count up at every 2 master clock pulses. The counter 60 produces the count signal COUNTOUT (0, 0, 1, 1, 2, 2, ... 59, 59, 60, 60) which is applied to the modulators 48 as the control signal 54 and to the A, B and C comparators 62, 64, and 66.

In the A comparator 62, if the signal COUNTOUT from the counter 60 coincides with the reference data A(=60), the comparator 62 produces an "H" level signal which is applied to the A latch 68. In the latch 68, if the master clock pulse signal is at an "H" level, the signal SIGA of "H" level is produced. The "H" level SIGA is applied to the terminal SEL0 of the selector 58. Thus, the selector 58 produces the signal 1/3 CLK as shown in FIG. 7 from the terminal OUT.

The B counter 60 counts up in accordance with the 1/3 CLK signal and produces the signal COUNTOUT (61, 61, 61, 62, 62, 62. . . ).

In the correcting unit, one pulse interval of the clock signal SELOUT of the selector 58 is elongated in order such as 1/2, 1/3, 1/5 and 1/9 CLK to elongate the counting interval of the B counter 60. Thus, the control signal 54 has a non-linear characteristic.

Figure 8:
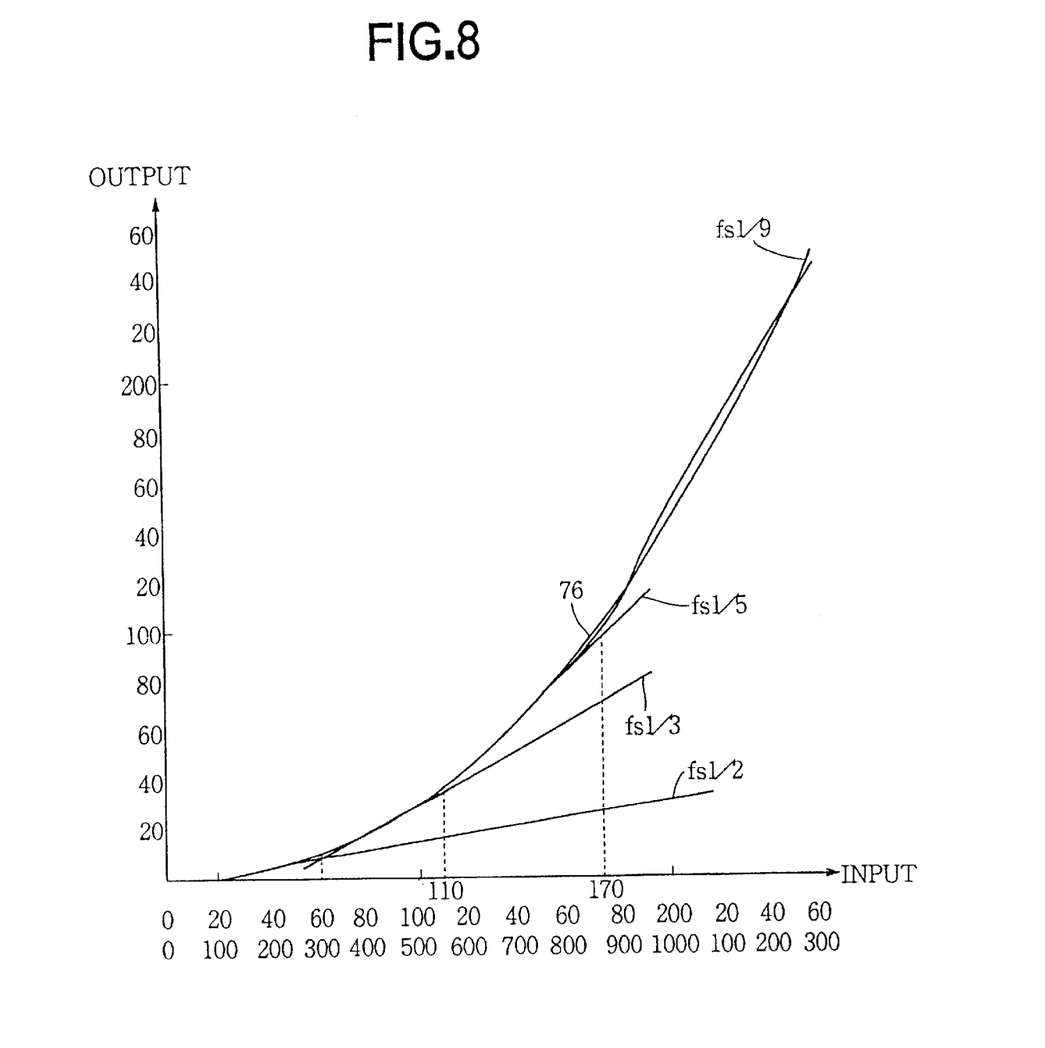
FIG. 8 is a graph showing modulation characteristics of the correcting unit.

FIG. 8 shows a modulation characteristic in the tone correcting unit.

A desired modulation characteristic 76 approximates to a straight line fs1/2 based on the signal 1/2 CLK in the range of input values between 0 and 60, to a straight line fs1/3 based on the signal 1/3 CLK in the range of input values between 61 and 110, to a straight line fs1/5 based on the signal 1/5 CLK in the range of input values between 111 and 170, and to a straight line fs1/9 based on the signal 1/9 CLK at values over 171.

Each PWM modulator 48 compares the tone data from the FF 46 with the control signal 54 and continues to produce a driving signal until the tone data coincides with the control signal.

The driving signal having the pulse width corresponding to the tone data and the control signal is applied to the signal electrodes A0, A1, A2, A3 . . . When the scanning electrode Kn (n=0, 1, 2, 3. . .) becomes "H" level, the pixel is activated to emit light. Thus, a desired tone having the characteristic of FIG. 8 is obtained.

In the embodiment, divided frequency of the clock signal is changed to obtain a desired modulation characteristic. Thus, the number of set data is reduced and the scale of the circuit is reduced.

Figure 9:
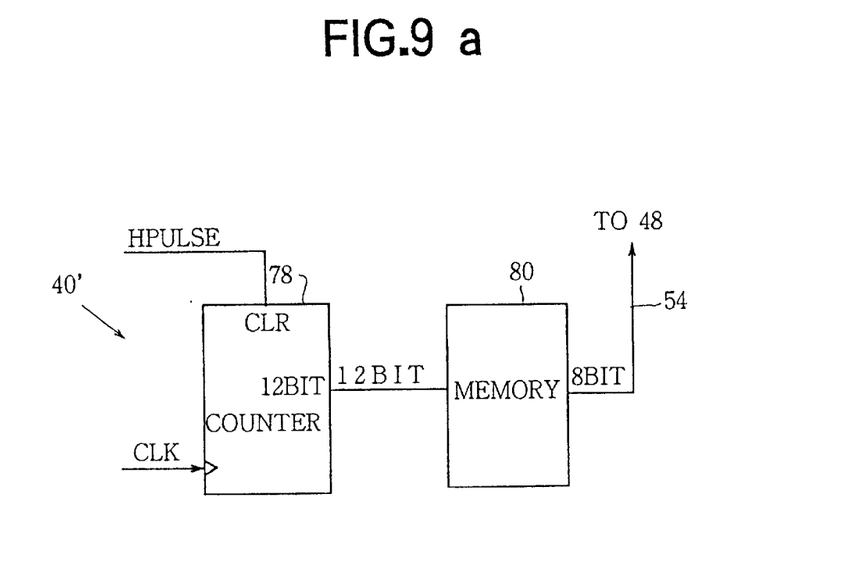
FIGS. 9a and 9b are diagrams showing a second embodiment of the correcting unit.

FIG. 9a shows a second embodiment of the tone correcting unit. A tone correcting unit 40' comprises a counter 78 of 12-bit applied with HPULSE and CLK signals, and a memory 80 (ROM or RAM) applied with an output signal of the counter 78. The memory 80 is provided with a table as shown in FIG. 9b. In the table, an output signal is determined in dependency on an input signal. The memory produces the control signal 54 derived from the table in accordance with the input signal which is applied to the modulators 48.

In the embodiment, since the number of bits of the counter 78 is 12 which is larger than that of the memory 80. Since the number of the data for the luminance is large, fine correction of the tone can be performed.

The system to the present invention has advantages as follows.

(1) The digital circuit does not vary with time.

(2) It is easy to adjust the correcting value.

(3) It is possible to effectively use the entire number of input luminance data. Consequently, the video signal is corrected to an appropriate gamma, thereby reproducing a picture true to an object.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A tone correcting system comprising:

modulator means for producing a tone signal in accordance with a video input digital signal;

a display having a display panel for displaying an image in dependence on the tone signal;

control signal generator means for generating a control signal for controlling the modulator means so as to control the tone signal; and said control signal generator means including means for generating control clock signals at sequentially changing cycles thereby giving a non-linear characteristic to the control signal, thereby controlling the tone signal produced by the modulator means.

2. The system according to claim 1, wherein said control signal generator means includes a counter (60) for counting a master clock pulse in accordance with said control clock signals.

3. The system according to claim 2, further comprising means for elongating a succeeding cycle when a count of said counter dependent on a preceding cycle reaches a predetermined value.

4. A tone correcting system comprising:

a modulator for producing a tone signal in accordance with a video input signal;

a display having a display panel for displaying an image in dependence on the tone signal;

a counter provided to be operated in accordance with a master clock signal;

a comparator for comparing a count value of the counter with reference values in order;

a control clock signal generator provided for generating control clock signals at sequentially changing cycles in accordance with comparison results of the comparator; and a control signal generator for generating a control signal having a non-linear characteristic for controlling the modulator means so as to control the tone signal in accordance with the control clock signals.

* * * * *